United States Patent [19]

Healy, Sr.

[11] 4,237,937
[45] Dec. 9, 1980

[54] DEVICE FOR SEALING DAMAGED TUBULAR MEMBERS

[75] Inventor: Robert D. Healy, Sr., Chesterfield, Mass.

[73] Assignee: Quabbin Industries, Inc., Westover, Mass.

[21] Appl. No.: 19,801

[22] Filed: Mar. 12, 1979

[51] Int. Cl.³ .............................................. F16L 55/10
[52] U.S. Cl. ...................................... 138/97; 138/89; 165/71; 165/76; 29/525
[58] Field of Search ................ 138/89, 96 R, 96 T, 138/97, 98; 165/71, 76; 29/401 F, 521, 525; 220/284, 307, 352, DIG. 19; 215/355

[56] References Cited

U.S. PATENT DOCUMENTS

| | | |
|---|---|---|
| 73,439 | 1/1868 | Copeland . |
| 145,631 | 12/1873 | Copeland . |
| 188,625 | 3/1877 | Hand . |
| 791,351 | 5/1905 | Malloy ................................. 138/89 |
| 2,329,801 | 9/1943 | Wellborn ............................. 138/89 |
| 2,764,184 | 9/1956 | Fitzhugh et al. ..................... 138/89 |
| 2,856,963 | 10/1958 | Hoerter ............................... 138/89 |
| 3,020,929 | 2/1962 | Knecht ................................ 138/89 |
| 3,119,177 | 1/1964 | Knecht ................................ 138/89 |
| 3,691,609 | 9/1972 | Ice et al. ........................... 138/89 X |
| 3,708,098 | 1/1973 | Roznovsky ....................... 138/89 X |
| 3,785,291 | 1/1974 | Bergbauer et al. ................. 165/76 X |
| 3,900,939 | 8/1975 | Greacen ............................. 138/89 X |
| 4,019,541 | 4/1977 | Koppl .................................. 138/89 X |
| 4,158,370 | 6/1979 | Larson ............................... 138/97 X |
| 4,178,966 | 12/1979 | Savor et al. ........................... 138/89 |

FOREIGN PATENT DOCUMENTS 670409 4/1952 United Kingdom .................... 138/89

*Primary Examiner*—James E. Bryant, III
*Attorney, Agent, or Firm*—Jones, Tullar & Cooper

[57] ABSTRACT

The present invention relates to a new improved device for sealing damaged tubular members by using a readily removable cylindrically configurated member which is disposed securely within open end sections of the tubular member. The present device includes a projecting end portion which is insertable into the damaged tubular member and which is connected integrally to a sleeve portion configurated externally with tube engaging projections and internally with a retraction device for removing the device when tube repairs are effected. The device of the present invention thus provides a useful means for sealing damaged tubular members of a multi-tubular unit without requiring complete shutdown each time an individual tubular member becomes damaged or inoperable.

5 Claims, 3 Drawing Figures

U.S. Patent     Dec. 9, 1980     4,237,937
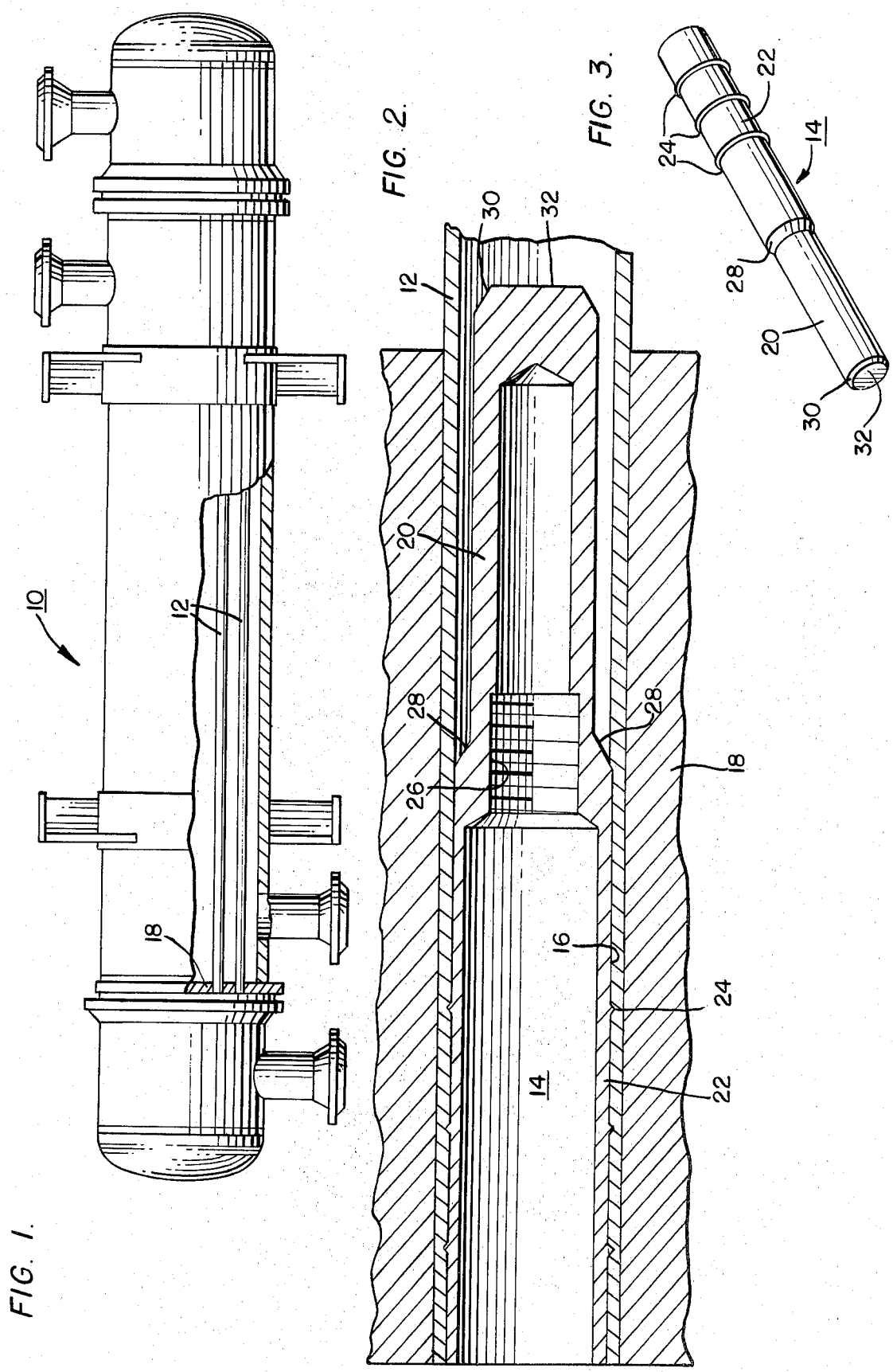

DEVICE FOR SEALING DAMAGED TUBULAR MEMBERS

FIELD OF THE INVENTION

The present invention relates generally to a device having a projecting end portion which is insertable into an open end section of a damaged tubular member and which is connected integrally to a cylindrical sleeve portion having means to engage the inner tubular wall surface and thereby seal operation of the damaged tubular member without disrupting operation of non-damaged tubular members of the unit. The cylindrical sleeve includes externally projecting tube wall engaging flanges and internally disposed retraction means for removing the device when tube repairs are effected.

BACKGROUND OF THE INVENTION

Numerous industrial units such as heat exchangers requiring a large number of tubes as s component are known to the art. Typically, these units are subjected to a combination of corrosive and stress conditions during operation which damages individual tubes thereby rendering the unit either inefficient or inoperative.

One method of repairing isolated tubes which become damaged in a multi-tube unit is to completely remove and replace the damaged tube. An obvious disadvantage of this method is that not every damaged tube is irrepairable. For example, tubes having minor leaks may be sealed and those tubes which become clogged with fouling buildup may be purged by anyone of a variety of either chemical or mechanical treatments. Another obvious disadvantage of replacing each individual tube which becomes damaged is that the entire unit including mostly operative tubes must be removed from on-line status for extended periods of time. This method is not only expensive but it is also highly inefficient in practice.

One current method for quickly sealing damaged tubes without effecting tube replacement is to seal the open ends of the tube with a tapered plug. The tapered plus is driven into the open ends of the tube and secured therein by welding the plug in place. This method provides a quick efficient solution to isolated tube damage. However, because the tapered plug is driven and welded onto the open tube ends, the tube for all practical purposes becomes irrepairable and during shut-down, the plugged tubes must be replaced with new tubes. Thus, repair of minor damaged or fouled tubes is not practical by means of this method which also invites unnecessary expense in replacement of tubes which can otherwise be repaired.

It has now been found that by practice of the present invention, individual tubes which become damaged in a multitube unit may be simply and efficiently sealed by means of a readily removable cylindrically configurated member which is disposed securely within open ends of the damaged tubular member.

SUMMARY OF THE INVENTION

The present invention generally stated provides a new improved device for sealing damaged tubular members by means of a readily removable cylindrically configurated member which is disposed securely within open end sections thereof. The present device includes a projecting end portion which is insertable into the open end sections and which is connected integrally to a sleeve portion configurated externally with tube engaging projections and internally with a retraction means for readily removing the device when repairs are being effected.

It is an object of this invention to provide a device for sealing damaged tubular members of a multi-tubular unit without requiring complete shut-down each time an individual tube becomes damaged.

It is also an object of this invention to provide a method for sealing damaged tubes by means of a cylindrically configurated member having tube engaging, non-damaging projections which effectively seal the tube and yet may be readily removed for renewed operation when tube repairs are effected.

It is yet another object of this invention to provide a new improved device for sealing damaged tubes of a multi-tube unit in a simple, efficient non-expensive manner.

These and other objects and advantages of the present invention will become more readily apparent from the more detailed description of the preferred embodiments taken in conjunction with the drawings wherein similar elements are identified by like numerals throughout the several views.

DESCRIPTION OF THE FIGURES

FIG. 1 illustrates a multi-tube heat exchanger taken in a partially broken side elevational view;

FIG. 2 illustrates the device of the present invention in half-section taken as a side elevational view in sealing position within an open end portion of a damaged tube; and FIG. 3 is a perspective view of the device of the present invention.

DETAILED DESCRIPTION OF PREFERRED EMBODIMENTS

FIG. 1 illustrates a conventional multi-tube heat exchanger 10 having tubes 12 positioned internally for operation. When an individual tube 12 becomes damaged either because of leakage or foulage, device 14 is inserted into an open end section 16 thereof. Tubes 12 are illustrated to be in operating position by tube supporting wall 18.

The present tube sealing device 14 includes a cylindrically configurated portion 20 which is connected integrally to a sleeve portion 22 having external tube engaging projections 24. Typically, tubes 12 are formed of relatively soft materials such as copper or the like having high heat transfer coefficients and when the sealing device 14 is inserted into an open end, projections 24 seat within the inner wall portion of the tube and thereby effectively seal the tube from further operation. When heat exchanger 10 is shut-down ultimately for repairs and it is noted that tube 12 may be either purged of fouling or leakage may be simply corrected, sealing device 14 may be removed by means of a puller, not shown, having a screw threaded end for engagement with threads 26 disposed within the cylindrically configurated projecting portion 20 of device 14. Although threads 26 are illustrated to serve as a retraction means for removing sealing device 14 when tube repairs are effected, it will be apparent that a number of different engagements such as bayonet locks or the like may be used if desired.

Sealing device 14 is configured with sleeve 22 having a diameter approximating the inner diameter of tube 12 which is being sealed from further operation. Thus, a friction fit is effected with the sleeve contacting the inner wall surface of tube 14 with sealing being more completely effected by means of projections 24. The projections are illustrated as circumferentially disposed ribs having a triangular cross sectional strucutre. It is also recognized that the projections 24 may be positioned about sleeve 22 in a sprial pattern providing the projections appear constructively in a continuous pattern about at least one entire revolution along the outer surface of the sleeve. In a preferred embodiment illustrated in the drawings, the projections are positioned as three separate rings integral with the outer surface of sleeve 22 and disposed approximately equidistant apart.

Cylindrically configured projecting portion 20 is disposed integrally with sleeve 22 adjacent the tube retraction means by means of inwardly tapered flange 28. Thus, the outer diameter of projection 20 is smaller than the inner diameter of tube 12 and correspondingly smaller than the outer diameter of sleeve 22.

Projection 20 serves several purposes namely, by having a slightly smaller outer diameter, it may be readily inserted into tube 12 without use of excessive force since there is no contact between the projection 20 and the inner wall surface of the tube being plugged. Also, the projection 20 serves to buffer any pressure which may build in the tube during operating conditions thereby relieving excessive pressure on the seal effected by sleeve 22 and tube engaging projections 24.

Within projection 20 is bore 30 which may serve to receive any extension of the puller used to remove device 14 when tube repairs are being effected. The illustrated device 14 also includes end flanges 30 tapered to front edge 32.

Device 14 may be machine tooled from a hard metal alloy as desired. However, because of the corrosive nature of the environment experienced within multi-tube heat exchangers or the like, stainless steel is the preferred material of construction.

Installation of device 14 may be conventional means. Specifically, the device may be driven into the tube by a hammer or related means. Not only is this inexpensive, but proper installation is quickly achieved without time-consuming welding, such as is required in installing prior art plugs.

Device removal is also a simple task. By applying an outward retraction force, the device 14 is removed from within the damaged tube 12. Thus tube repairs may be effected since plug removal does not entail irreparable tube damage. A convenient application of such force may be achieved by means of a slide hammer by way of example. A slide hammer attached to an inserted bolt 26 is capable of overcoming the gripping action furnished by the projecting ribs 24.

Having described the invention with particular reference to a preferred embodiment, it will be obvious to those skilled in the art to which the present invention relates, that various changes and modifications may be made therein without departing from the spirit and scope of the invention as disclosed and claimed.

What is claimed is:

1. In a tubular member having a sealing device disposed securely within an open section thereof, the improvement wherein the sealing device comprising in combination:
   (A) a hollow sleeve dimensioned and configured to approximate the inner diameter of the tubular member to be sealed;
   (B) a projecting cylindrically configurated member having an outer diameter smaller than the outer diameter of the hollow sleeve and integrally disposed to the outer diameter hollow sleeve by an inwardly tapered flange; and
   (C) at least one circumferentially disposed rib positioned about the hollow sleeve for contact with the inner diameter of the tubular member;
   (D) said hollow sleeve containing a retraction means disposed within the tapered flange portion of the device.

2. The device of claim 1 wherein three ribs are disposed approximately equidistant apart about the outer surface of the sleeve.

3. The device of claim 1 wherein a bore is disposed within the projecting cylindrically configurated member.

4. The device of claim 1 wherein the retraction means is defined by machined threads.

5. A method for removably sealing a damaged tubular member which comprises, inserting the device of claim 1 into opposite open ends of the tubular member, and thereafter removing said device by using the retraction means when tubular member repairs are being effected.

* * * * *